(12) United States Patent
Von Euler et al.

(10) Patent No.: US 11,137,792 B2
(45) Date of Patent: Oct. 5, 2021

(54) CONTROLLABLE DEVICE AND A KNOB FOR CONTROLLING A FUNCTION OF THE CONTROLLABLE DEVICE

(71) Applicant: Zound Industries International AB, Stockholm (SE)

(72) Inventors: Marcus Von Euler, Stockholm (SE); Niclas Ihrsén, Lidingö (SE)

(73) Assignee: Zound Industries International AB, Stockholm (SE)

( * ) Notice: Subject to any disclaimer, the term of this patent is extended or adjusted under 35 U.S.C. 154(b) by 0 days.

(21) Appl. No.: 16/646,393

(22) PCT Filed: Sep. 11, 2018

(86) PCT No.: PCT/SE2018/050914
§ 371 (c)(1),
(2) Date: Mar. 11, 2020

(87) PCT Pub. No.: WO2019/054921
PCT Pub. Date: Mar. 21, 2019

(65) Prior Publication Data
US 2020/0272190 A1     Aug. 27, 2020

(30) Foreign Application Priority Data

Sep. 14, 2017   (SE) .................................. 1751119-7

(51) Int. Cl.
*G05G 1/12*     (2006.01)
*G06F 3/0354*   (2013.01)
(Continued)

(52) U.S. Cl.
CPC ............. *G05G 1/12* (2013.01); *G06F 3/0354* (2013.01); *G06F 3/0416* (2013.01); *H04R 1/028* (2013.01);
(Continued)

(58) Field of Classification Search
None
See application file for complete search history.

(56) References Cited

U.S. PATENT DOCUMENTS 10,460,860 B2 * 10/2019 Stottinger .............. G05G 1/105
2005/0253804 A1 * 11/2005 Tai ......................... G06F 3/0354
345/156
(Continued)

FOREIGN PATENT DOCUMENTS

CN      204046795 U      12/2014
EP      3190341 A1       7/2017
(Continued)

OTHER PUBLICATIONS

Programmable WiFi Control Knob. Website retrieved on the internet at https//hackaday.io/project/8118-programmable-wifi-control-knob, and dated by the "WayBack Machine" at https://web.archive.org/web/20170118124654/https://hackaday.io/project/8118-programmable-wifi-control-knob as Oct. 19, 2015.
(Continued)

*Primary Examiner* — Vicky A Johnson
(74) *Attorney, Agent, or Firm* — Knobbe Martens Olson & Bear LLP

(57) ABSTRACT

The present disclosure generally relates to a knob (100), a controllable device (200) and a combination (500) of a knob and a controllable device. In certain aspects of the disclosure, the controllable device (200) is embodied as a loudspeaker. The knob (100) may be used for controlling one or more functions of the controllable device (200). The knob (100) is a detachable knob configured for detachable attachment to the controllable device (200). Furthermore, the detachable knob (100) is configured to be communicatively coupled to the controllable device (200) to control the one or more functions of the controllable device (200).

18 Claims, 9 Drawing Sheets

(51) Int. Cl.
*G06F 3/041* (2006.01)
*H04R 1/02* (2006.01)
(52) U.S. Cl.
CPC ...... *H04R 2420/07* (2013.01); *H04R 2420/09* (2013.01); *H04R 2430/01* (2013.01)

(56) References Cited

U.S. PATENT DOCUMENTS

| | | |
|---|---|---|
| 2010/0253653 A1 | 10/2010 | Stambaugh et al. |
| 2013/0211844 A1 | 8/2013 | Sadwick |
| 2014/0117859 A1 | 5/2014 | Swatsky et al. |
| 2014/0210748 A1 | 7/2014 | Narita et al. |
| 2016/0026263 A1* | 1/2016 | Pesonen .................. G06F 3/038 345/156 |
| 2019/0073526 A1* | 3/2019 | Kirita .................... G06F 3/0354 |
| 2019/0113985 A1 | 4/2019 | Sawada et al. |

FOREIGN PATENT DOCUMENTS

| | | |
|---|---|---|
| WO | WO 2006/038135 | 4/2006 |
| WO | WO 2014/107467 A1 | 7/2014 |
| WO | WO 2017/078604 | 5/2017 |
| WO | WO 2017/114650 A1 | 7/2017 |
| WO | WO 2017/130677 | 4/2019 |

OTHER PUBLICATIONS

International Search Report for International Application No. PCT/SE2018/050914 dated Nov. 28, 2018.
Extended European Search Report dated May 6, 2021, corresponding to European Patent Application No. 18857180.6.

* cited by examiner

CONTROLLABLE DEVICE AND A KNOB FOR CONTROLLING A FUNCTION OF THE CONTROLLABLE DEVICE

CROSS REFERENCE TO RELATED APPLICATIONS

This application is a U.S. National Phase Application of PCT International Application Number PCT/SE2018050914, filed on Sep. 11, 2018, designating the United States of America and published in the English language, which is an International Application of and claims the benefit of priority to Sweden Patent Application No. 1751119-7, filed on Sep. 14, 2017. The disclosures of the above-referenced applications are hereby expressly incorporated by reference in their entireties for all purposes and form a part of this specification.

TECHNICAL FIELD

The present disclosure generally relates to a knob, a controllable device and a combination of a knob and a controllable device. The knob may be used for controlling at least one function, i.e. one or more functions, of the controllable device. As used in this disclosure, a controllable device is a device where one or more functions of the device may be controlled. In certain embodiments disclosed herein, the controllable device is a loudspeaker.

BACKGROUND

The International Patent Application No. PCT/EP2016/080612 (published under WO2017/114650A1 on 6 Jul. 2017) in the name of Zound Industries International AB was filed on 12 Dec. 2016 and relates to multi-function control of one or several multimedia playback devices such as loudspeakers. In accordance with one example embodiment of PCT/EP2016/080612, a loudspeaker may be equipped with a user interface arrangement having two knobs. FIG. 1 shows an example speaker as disclosed in PCT/EP2016/080612, where the loudspeaker is provided with two rotatable knobs. A first rotatable knob has a first rotational axis extending in a first axial direction. The first rotatable knob is rotatable around said first rotational axis to control a first function. Also, the first rotatable knob is configured to be displaced axially in said first axial direction of the first rotational axis to control a second function. A second rotatable knob has a second rotational axis extending in a second axial direction. The second rotatable knob is rotatable around said second rotational axis to control a third function. Also, the second rotatable knob is configured to be displaced axially in said second axial direction of the second rotational axis to control a fourth function. Hereby, the first and second rotatable knobs are enabled to collaboratively control multiple functions of the loudspeaker. In other words, PCT/EP2016/080612 makes it possible to control many different functions of the loudspeaker by using only two rotatable knobs. This contributes to a solution that is intuitive and easy to use.

In the last week of March 2017, Zound Industries International AB launched its series of URBANEARS CONNECTED SPEAKERS that at least partly builds on technology described in PCT/EP2016/080612.

SUMMARY

It is in view of the above background and other considerations that the various embodiments of the present disclosure have been made.

The present disclosure recognizes the fact that, at least in some scenarios, some users may find the knobs of the user interface arrangement in PCT/EP2016/080612 unnecessarily inflexible. Since the knobs of the user interface arrangement in PCT/EP2016/080612 are fixed to the loudspeaker disclosed in PCT/EP2016/080612, the user cannot control functions of the loudspeaker by means of the knobs from a position or location which is remote to the loudspeaker.

In view of the above, there is a need to provide a solution that is more flexible. Accordingly, a general object is to provide a more flexible solution for controlling one or more functions of a controllable device.

A person skilled in the art who starts with the solution in FIG. 1 and who wants to improve the flexibility would most likely add a possibility to remotely control the one or more functions of the loudspeaker wirelessly by means of a mobile terminal such as a mobile telephone or tablet computer, because solutions for remotely controlling a loudspeaker wirelessly are already known in the art, e.g. through PCT/US2013/078559 which was published under WO2014/107467A1 on 10 Jul. 2014.

In contrast to such solution, the present disclosure suggests a different solution according to the appended independent claims. Advantageous embodiments are defined in the appended dependent claims.

In a first of its aspects, this disclosure therefore presents a knob for controlling at least one function of a controllable device. The knob is a detachable knob configured for detachable attachment to the controllable device. Furthermore, the detachable knob is configured to be communicatively coupled to the controllable device to control the at least one function of the controllable device.

In some embodiments, the detachable knob is detachably attachable to the controllable device by means of magnetic attraction. For example, the detachable knob may comprise at least one surface exhibiting magnetic properties. In one embodiment, the detachable knob comprises a magnetic element. The magnetic element may, for example, comprise a neodymium magnetic element.

In some embodiments, the detachable knob comprises a rechargeable element that is configured to be inductively recharged when the detachable knob is detachably attached to the controllable device.

In some embodiments, the detachable knob comprises a communications interface configured for wireless communication with the controllable device. In one embodiment, the wireless communication is a short-range wireless communication such as Bluetooth. In another embodiment, the wireless communication is Wi-Fi.

In some embodiments, the detachable knob is configured to control said at least one function of the controllable device when the detachable knob is detachably attached to the controllable device. Additionally, or alternatively, the detachable knob is configured to remotely control said at least one function of the controllable device when the detachable knob is detached from the controllable device.

In some embodiments, the detachable knob is a rotatable knob having a rotational axis extending in an axial direction, and wherein the detachable knob is rotatable around said rotational axis to control said at least one function. In one embodiment, the detachable knob has a substantially cylindrical shape. For example, the detachable knob may comprise a processor, a memory comprising instructions which are executable by said processor and a communications interface configured for wireless communication with the controllable device, wherein a rotation of the detachable knob around said rotational axis causes a signal to be transmitted to the processor for controlling said at least one function; and in response thereto the processor causes a signal to be transmitted, by means of the communications interface, to the controllable device for controlling said at least one function accordingly.

In other embodiments, the detachable knob is shaped as a polyhedron having a plurality of sides, each side being associated with a predetermined function of the controllable device, such that, in operation, the detachable knob is configured to generate a signal for controlling said at least one function of the controllable device based on orientation and/or rotation of the detachable knob. In one embodiment, the detachable knob is shaped substantially as a cube having six square sides. For example, the detachable knob may comprise a processor, a memory comprising instructions which are executable by said processor and a communications interface configured for wireless communication with the controllable device, wherein an orientation and/or rotation of the detachable knob causes a signal to be transmitted to the processor for controlling said at least one function; and in response thereto the processor causes a signal to be transmitted, by means of the communications interface, to the controllable device for controlling said at least one function accordingly. Said at least one function may for instance be controlled by rotating the detachable knob about a rotational axis which is oriented perpendicularly to a surface on which the detachable knob rests. In some embodiments, the detachable knob comprises an orientations sensor configured to determine an orientation of the detachable knob.

In some embodiments, the detachable knob is configured to be controlled by a voice command.

In a second of its aspects, this disclosure presents a controllable device. The controllable device is configured to be communicatively coupled to a knob such that the knob is configured to control at least one function of the controllable device. Furthermore, said knob is a detachable knob configured for detachable attachment to the controllable device.

In some embodiments, the controllable device comprises a user interface and the detachable knob is detachably attachable to said user interface. The user interface may, for example, comprise a touch-sensitive user interface. In one embodiment, the user interface comprises an E-ink display.

In some embodiments, the user interface is configured to control which at least one function that is controllable by means of the detachable knob.

In some embodiments, the detachable knob is detachably attachable to the controllable device by means of magnetic attraction. For example, the controllable device comprises at least one surface exhibiting magnetic properties. In one embodiment, the controllable device comprises a magnetic element. The magnetic element may be positioned in proximity to said user interface. The magnetic element may, for example, comprise a neodymium magnetic element.

In some embodiments, the controllable device is configured to inductively recharge the detachable knob when the detachable knob is detachably attached to the controllable device.

In some embodiments, the controllable device comprises a communications interface configured for wireless communication with the detachable knob. In one embodiment, the wireless communication is a short-range wireless communication such as Bluetooth. In another embodiment, the wireless communication is Wi-Fi.

In some embodiments, the controllable device is configured to be controlled by a voice command.

In some embodiments, the controllable device is a loudspeaker.

In a third of its aspects, this disclosure presents a combination of a knob and a controllable device according to the first and second aspects described hereinabove.

The various embodiments described herein provide a more flexible solution for controlling one or more functions of a controllable device. Since the detachable knob is configured for detachable attachment to the controllable device and configured to be communicatively coupled to the controllable device, it is possible control at least one function of the controllable device with the detachable knob from several locations. It is possible to control the at least one function of the controllable device with the detachable knob detachably attached to the controllable device. It is possible to control the at least one function of the controllable device remote from the controllable device. The embodiments described herein thereby provide a more flexible solution where the detachable knob may be placed at any surface, such as a suitable surface chosen by the user. From that surface, the detachable knob may control at least one function of the controllable device. Thus, a flexible solution, without the need for additional devices such as remote controls or mobile terminals, is provided.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

Generally speaking, the term "controllable device" as used herein refers to a device where one or more functions of the device may be controlled. The one or more functions may for example be any variable function that sets a certain value of the controllable device. Without limitations, examples of such functions may be volume, radio station, temperature, light, variable length of curtains, etc. The controllable device may accordingly be any device that has at least one function that may be controlled. Without limitations, examples of such controllable devices may be loudspeakers, televisions, temperature regulators, stoves, lighting systems, etc.

Figure 1:
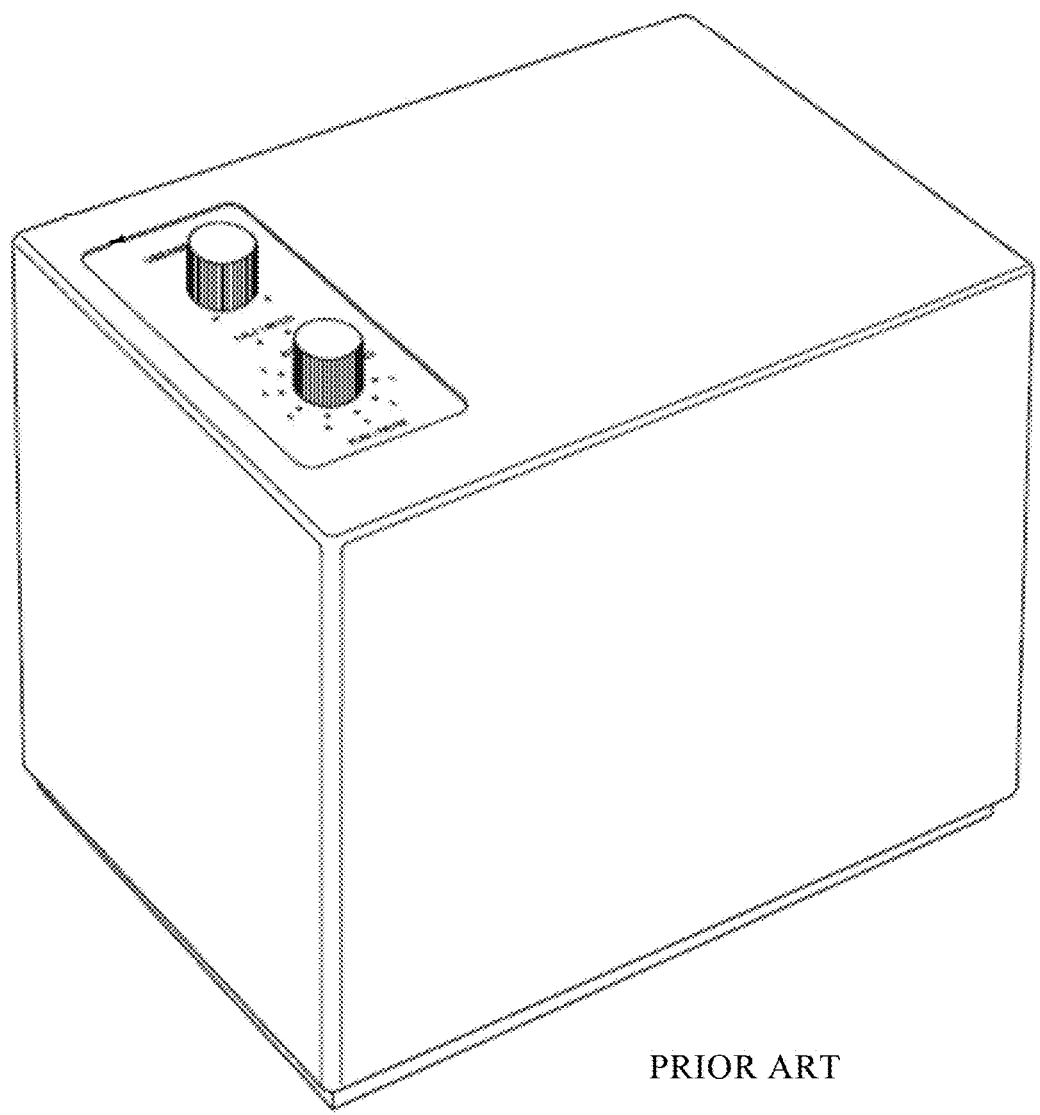
FIG. 1 illustrates an existing controllable device.
Figure 2:
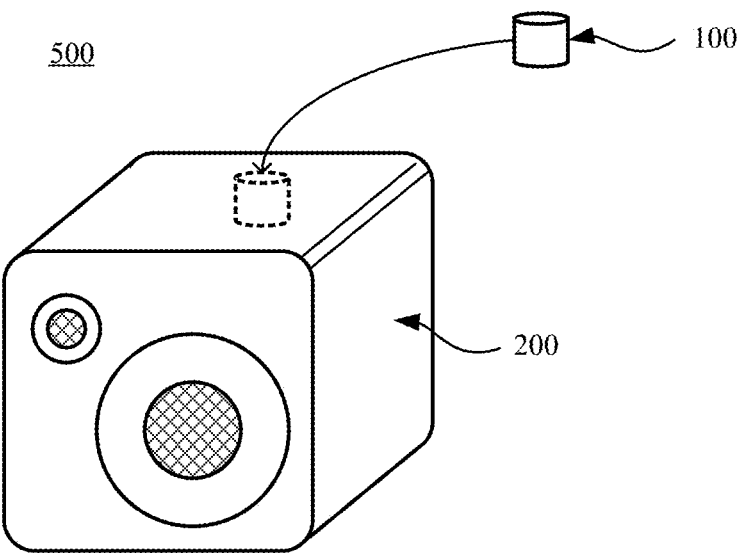
FIG. 2 shows an example embodiment of a combination of a controllable device and a detachable knob, where the knob is detached from the controllable device.
Figure 3:
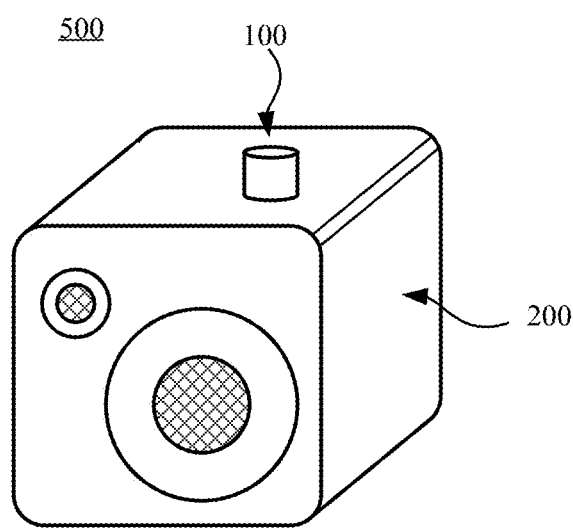
FIG. 3 shows an example embodiment of a combination of a controllable device and a detachable knob, where the knob is attached to the controllable device.

FIG. 2 schematically illustrates an example embodiment of the present invention with a combination 500 of a controllable device 200 and a detachable knob 100. The controllable device 200 is communicatively coupled to the detachable knob 100. In FIG. 2, the detachable knob 100 is detached from the controllable device 200. FIG. 3 shows an example embodiment of the combination 500 of the controllable device 200 and the detachable knob 100 where the detachable knob 100 is detachably attached to the controllable device 200.

Figure 4A:
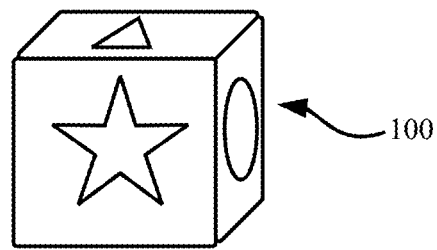
FIG. 4A shows an example of a detachable knob.

FIG. 4A schematically illustrates one example embodiment of the detachable knob 100 shown in FIG. 2 and FIG. 3. The detachable knob 100 is a knob, which is configured for detachable attachment to a controllable device 200. In other words, the knob 100 is capable of being detachably attached to the controllable device 200. The detachable knob 100 may be used for controlling at least one function, i.e. one or more functions, of the controllable device 200. The detachable knob 100 may be configured to control the function(s) of the controllable device 200 when the knob 100 is detachably attached to the controllable device 200. Additionally, or alternatively, the detachable knob 100 may be configured to control the function(s) of the controllable device 200 when the knob 100 is detached from the controllable device 200 and accordingly configured to control the controllable device 200 remotely. By introducing the detachable knob 100 a more flexible solution for controlling one or more functions of a controllable device 200 is provided. The solution is flexible while still easy to use with intuitive design and function. The detachable knob 100 itself is intuitive to the user. By placing the knob 100 at any appropriate position or location, e.g. chosen by the user, the at least one function of the controllable device 200 may easily be controlled regardless of where the user is situated.

In one advantageous embodiment, the controllable device may be a loudspeaker. Generally speaking, a loudspeaker may be an electroacoustic transducer which is configured to convert an electrical audio signal into a corresponding sound. Accordingly, the loudspeaker may be configured to provide audio output. The functions controlled by the detachable knob 100 may among others in this embodiment include for example a volume function, a selection function and/or a power function. The volume function may be used to control the played volume and be configured to increase or decrease the volume depending on the wishes or needs of the user. The selection function may, for example, be used to select which song that should be played by the controllable loudspeaker 200. Additionally, or alternatively, the selection function may, for example, be used to select an audio source of the audio to be played or to select which radio station to be played. The power function may, for example, be used to turn on or off the controllable device 200.

Which function(s) of the controllable device 200 to be controlled by the detachable knob 100 may in some embodiments be chosen by the user. Alternatively, the function(s) to be controlled by the detachable knob 100 may in some embodiments be preset.

The detachable knob 100 may be attached to the controllable device 200 in different ways. In one embodiment, the detachable knob 100 may be detachably attachable to the controllable device 200 by means of magnetic attraction. By using magnetic attraction, the attaching mechanism is simple and does not require complex arrangements on neither the knob nor the controllable device. Furthermore, there is no risk for the user to break the attaching mechanism, since it is not physically available to the user. By using magnetic attraction, it may also be easy for the user to attach the detachable knob 100 to the controllable device 200. By placing the detachable knob 100 sufficiently close to an attachment area on the controllable device 200 the magnetic attraction will force the detachable knob 100 into its right position and the need for placing the detachable knob 100 in an exact position is thus reduced. Furthermore, by using magnetic attraction for attaching the detachable knob 100 to the controllable device 200, the detachable knob 100 may be rotatable fixed and the chance for the detachable knob 100 to come off the controllable device 200 and to be lost is thus reduced. However, even if the detachable knob 100 is attachable to the controllable device 200 by means of magnetic attraction, the detachable knob 100 is not limited to only be attached to magnetic surfaces remote from the controllable device 200. The detachable knob 100 may also be placed at surfaces that are not magnetic. The detachable knob 100 may control the at least one function of controllable device 200 regardless of the kind of surface which it is placed on.

When the detachable knob 100 is attached to the controllable device 200 by means of magnetic attraction, the detachable knob 100 and the controllable device 200 will attract each other when they are in close proximity. When the distance between them is sufficiently small, they will be rotatable fixed to each other. In one embodiment, the detachable knob 100 may comprise at least one surface exhibiting magnetic properties. The at least one surface exhibiting magnetic properties may be the housing of detachable knob 100. Alternatively, the at least one surface exhibiting magnetic properties may be obtained by adding an extra surface of magnetic properties on the housing of the detachable knob 100. In one embodiment, the controllable device 200 may comprise at least one surface exhibiting magnetic properties. The at least one surface exhibiting magnetic properties may be obtained by the housing of the controllable device 200. Alternatively, the at least one surface exhibiting magnetic properties may be obtained by adding a surface of magnetic properties outside the housing.

Figure 5A:
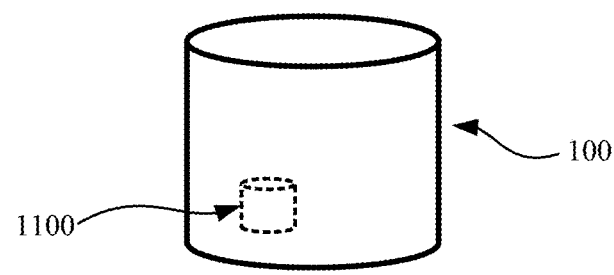
FIG. 5A shows an example of a detachable knob with a magnetic element.
Figure 5B:
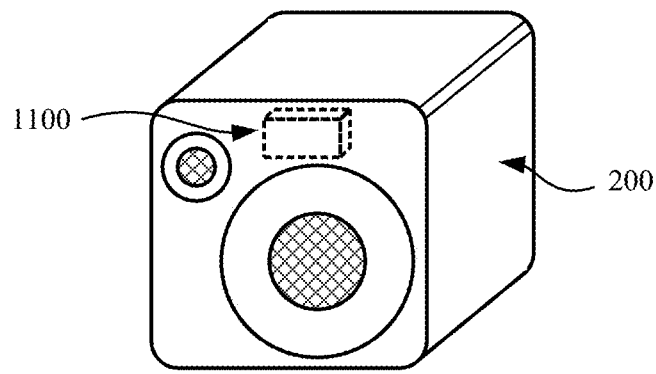
FIG. 5B shows an example of a controllable device with a magnetic element.

In one embodiment, the knob 100 may comprise a magnetic element 1100, as illustrated in FIG. 5A. Alternatively, in one embodiment, the controllable device 200 may comprise a magnetic element 1100, as illustrated in FIG. 5B. In one embodiment, both the detachable knob 100 and the controllable device 200 may comprise magnetic elements 1100. The magnetic element 1100 may be a material or object that produces a magnetic field. The magnetic element 1100 may comprise a neodymium magnetic element. An advantage with using a neodymium magnetic element is its high magnetic capacity per weight. Accordingly, the weight of the device comprising the neodymium magnetic element can be kept small. When the detachable knob 100 comprises a magnetic element 1100, the detachable knob 100 may be attached to any surface exhibiting magnetic properties. This will make it possible to attach the detachable knob 100 to any suitable surface with a force stronger than gravity. The surface may be at the controllable device 200 as illustrated in FIG. 3, but may also be surfaces separated and remote from the controllable device 200. Since the attachment force may be stronger than gravity, it is possible not only to attach the detachable knob 100 to a horizontal surface, but also to a vertical surface. For example, if the controllable device 200 is placed in the living room, while a user is situated in the kitchen preparing dinner, the user may place the detachable knob 100 at, for example, the front door of the refrigerator. With the detachable knob 100 attached to the refrigerator, it may be easy to keep track of the detachable knob 100. Furthermore, it may also be easy to navigate the detachable knob 100 for remotely controlling the function(s) of the controllable device 200.

Figure 6:
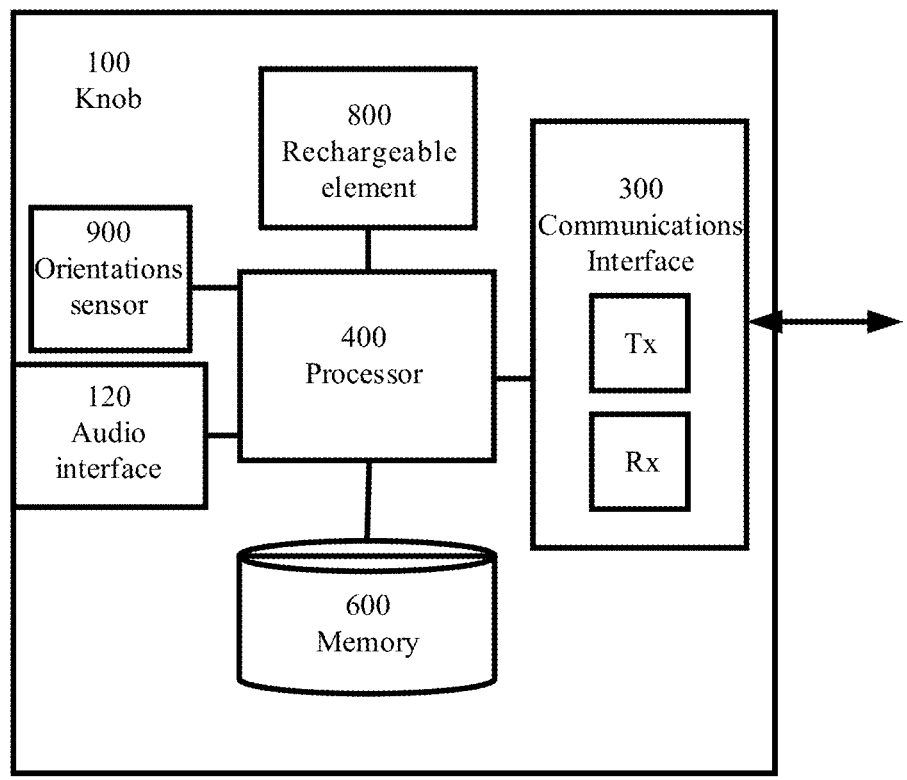
FIG. 6 shows an example implementation of a detachable knob.

In order for the detachable knob 100 to control the controllable device 200, it may need a power source. In one embodiment, the detachable knob 100 may comprise a rechargeable element 800, as is illustrated in FIG. 6. The rechargeable element 800 may be configured to be inductively recharged when the detachable knob 100 is detachably attached to the controllable device 200, as is illustrated in FIG. 3. The controllable device 200 is accordingly configured to inductively recharge the detachable knob 100. Inductive charging uses an electromagnetic field to transfer energy between two objects through electromagnetic induction. The energy is sent through an inductive coupling from the controllable device 200 to the detachable knob 100. The sent energy is then used to charge the rechargeable element 800. By using a rechargeable element 800 in the detachable knob 100, where the element is inductively recharged by the controllable device 200, the electronics of the detachable knob 100 may be enclosed within the outer housing of the knob 100. Since the rechargeable element 800 may be rechargeable, there is no need to open up the detachable knob 100 in order to change batteries or the like. Accordingly, there will be less risk of electrical faults such as short circuit due to insulation failure, especially where connections are made or broken frequently. Furthermore, by using a rechargeable element 800 which may be inductively rechargeable, the convenience and aesthetic quality will increase since the need for cables or charging contacts may be eliminated or at least reduced. As previously described, the detachable knob 100 may be communicatively coupled to the controllable device 200 in order to control the at least one function of the controllable device 200. As is illustrated in FIG. 6, the detachable knob 100 in one embodiment may comprise a communications interface 300, or a communications circuitry, configured for wireless communication with the controllable device 200. The meaning of wireless communication is the transfer of signals between the two units 100, 200 while they are not connected by a wire. By transferring the signals between the detachable knob 100 and the controllable device 200 wirelessly, the need for wires, cables and electrical conductors are reduced. It makes the combination of the detachable knob 100 and the controllable device 200 more flexible and introduces the possibility to transmit and/or receive signals between the two devices even if they are not physical connected. The physical distance between the two devices are thus not limited by physical cables or connections. Furthermore, the connection between the detachable knob 100 and the controllable device 200 is not subjected to wear and tear, which makes the connection more sustainable.

The communications interface 300 may comprise a transmitter (Tx) and a receiver (Rx). Alternatively, the communications interface 300 may comprise a transceiver (Tx/Rx) combining both transmission and reception capabilities. For example, the communications interface 300 may include a radio frequency interface allowing the detachable knob 100 to communicate with the controllable device 200 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, short-range communication such as Bluetooth, etcetera. The communication interface 300 may be configured to enable wireless communication with the controllable device 200. Also, the communication interface 300 may be configured to enable communication with a cloud storage.

Figure 7A:
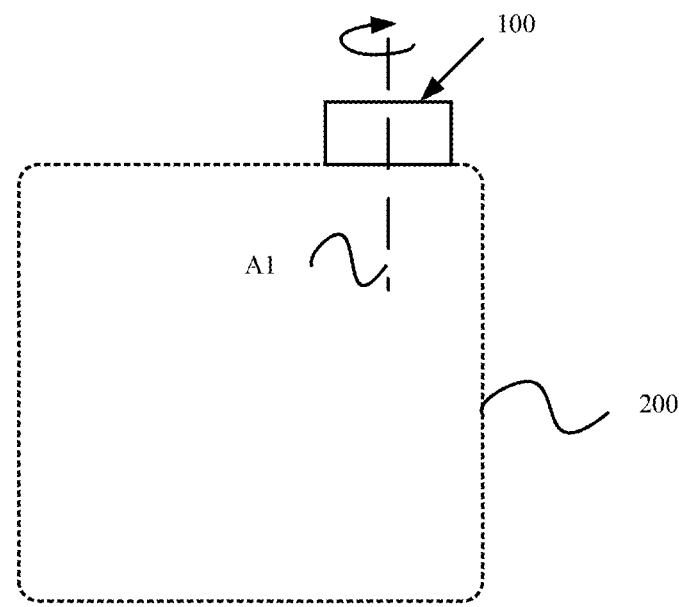
FIG. 7A illustrates a side view of a controllable device and a detachable knob, where the rotational axis of the knob is illustrated.
Figure 7B:
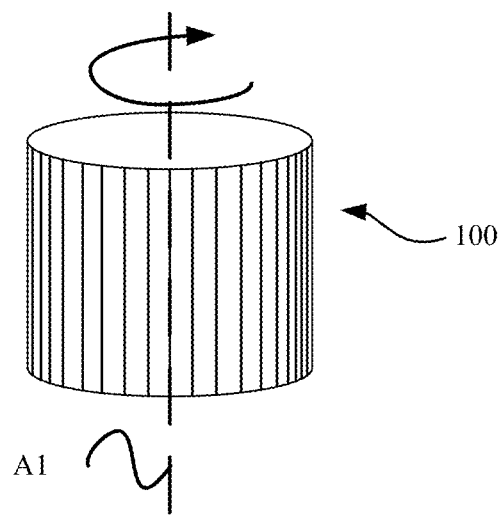
FIG. 7B illustrates a detachable knob with its rotational axis.

In some embodiments, the detachable knob 100 may be a rotatable knob 100. The rotatable knob 100 has a rotational axis A1, as illustrated in FIGS. 7A and 7B, extending in an axial direction. The knob 100 may be rotatable around said rotational axis A1 in order to control the at least one function of the controllable device 200. As an example, one of the functions of the controllable device 200 that may be controlled may be a volume function. By rotating the rotatable knob 100 clockwise around the rotational axis A1, the volume may be increased. By rotating the rotatable knob 100 counter-clockwise around the rotational axis A1, the volume may be decreased. This occurs regardless of whether the detachable knob 100 is attached to or detached from the controllable device 200. Accordingly, the controlling of the function is not dependent on the surface of which the detachable knob 100 is detachably attached to, rather it is dependent on the movement of the detachable knob in relation to the rotational axis A1. This makes it possible to place the detachable knob 100 at any surface, such as a suitable surface chosen by the user. Thus, the detachable knob 100 may not be limited to be attached to surfaces containing certain properties.

As another example, one of the functions of the controllable device 200 that may be controlled may be the selection of a radio station. By rotating the detachable knob 100 clockwise around the rotational axis A1, the frequency may be increased and accordingly the radio station may be changed. Likewise, when the detachable knob 100 is rotated counter-clockwise around the rotational axis A1, the frequency may be decreased and the radio station accordingly changed. In one embodiment, the user may activate the made choice/selection of radio station only by thereafter pressing, or tapping, the detachable knob 100. The user may then be provided with a tactile, audio and/or visual feedback in order to ensure the user of that the selection has been registered by the detachable knob 100. The tap or press may be registered by an orientation sensor 900, such as an accelerometer, within the detachable knob 100. An advantage with the functionality that a press or a tap may activate the made choice/selection, is that it may be possible to rotate the detachable knob 100 to a wanted choice/selection without having to listen to all passed radio stations on the way to the wanted choice/selection. In one embodiment, the made choice/selection of all the functions of the controllable device 200 may be activated by a press or a tap. Alternatively, the made choice/selection of only some of the functions may be activated by a press or a tap. In another embodiment, the made choice/selection of none of the functions may be activated by a tap or a press. In the embodiments when no activation of the made choice/selection is needed, for example for the function of selecting a radio station, the user may have the chance to listen to all passed not chosen alternatives, such as all passed radio stations, on the way to the wanted choice/selection.

Figure 7C:
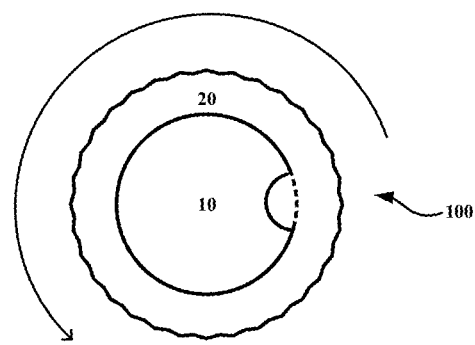
FIG. 7C illustrates an example of an underside of a two part detachable knob.
Figure 7D:
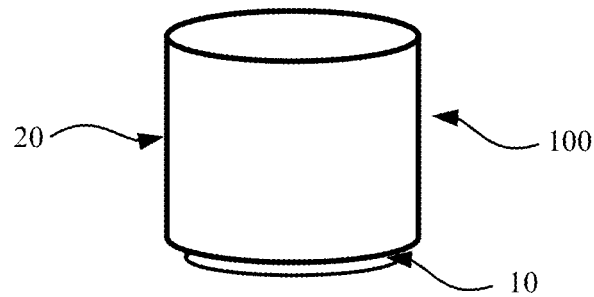
FIG. 7D illustrates an example of a side view of a two part detachable knob.

In some embodiments, the detachable knob 100 may be constructed of two parts, as is illustrated in FIG. 7C and FIG. 7D. The two parts may be a center part 10 and a peripheral part 20. In FIG. 7C, the underside of a detachable knob 100 in one such embodiment is illustrated and in FIG. 7D, a side view of the detachable knob 100 in one such embodiment is illustrated. The center part 10 may be the middle part of the underside of the detachable knob 100 and may be fixed in relation to the surface which the detachable knob 100 may be detachably attached to. The peripheral part 20 may be the outer surface of the detachable knob 100. The peripheral part 20 may surround the center part 10 or may be located above the center part, as illustrated in FIG. 7D.

The center part 10 may be configured to detachably attach the detachable knob 100 to a surface. This may be performed by magnetic attraction, as described above, or by friction between the center part 10 and the surface to which the detachable knob 100 may be detachable attached to. The peripheral part 20 may be configured to be rotated, as illustrated with the arrow in FIG. 7C. Accordingly, when the detachable knob 100 is rotated around its rotational axis A1, only the peripheral part 20 will rotate, the center part 10 will be fixed to the surface. By using a two part detachable knob 100, the user may receive a better understanding of how much the detachable knob 100 has been rotated. Since the detachable knob 100 will have a fixed reference point, it may generate a better feeling of the correspondence between the movement around the rotational axis A1 and the controlled function. In some of the embodiments where the detachable knob 100 may be inductively recharged, the detachable knob 100 may preferably be constructed of two parts. By using a two part knob in these embodiments, it may be possible to use the detachable knob 100, while the detachable knob 100 at the same time may be efficiently recharged.

In some embodiments, the center part 10 may have a specific design such that it may be perfectly fitted into a matching surface, like a key in a matching keyhole. One example of such design is illustrated in FIG. 7C. The matching surface may be any surface, for example a plate, with a hole whose shape corresponds with the shape of the center part 10. The matching hole may be configured so that when the detachable knob 100 may be put onto the matching surface, the center part 10 of the detachable knob 100 may be locked into a certain position. In order for the detachable knob 100 to still be rotatable, the peripheral part 20 may be located above the center part 10, as illustrated in FIG. 7D. Accordingly, the peripheral part 20 may be free to rotate upon the matching surface while the center part 10 of the detachable knob 100 may be detachably attached into the matching surface. By locking the center part 10 of detachable knob 100 into a matching surface, the detachable knob 100 may get a reference point that will guide the detachable knob 100 about the amount of rotation that may be performed in order to achieve a certain result of the controlled function of the controllable device 200. Furthermore, by using a center part 10 of a certain design it may be possible to attach a detachable knob 100 onto a vertical surface without using magnetic attraction. This may be achieved by putting the matching plate with the hole that corresponds with the center part 10 of the detachable knob 100 onto any suitable vertical surface.

With reference to FIG. 6, the detachable knob 100 in some embodiments may comprise a processor 400 and a memory 600. The memory 600 may comprise instructions which are executable by the processor 400. The detachable knob 100 may further comprise a communications interface 300, or a communications circuitry, configured for wireless communication with the controllable device 200. An orientation and/or rotation of the detachable knob 100 causes a signal to be transmitted to the processor 400 for controlling the at least one functions of the controllable device 200. In response thereto the processor 400 may cause a signal to be transmitted, by means of the communications interface 300, to the controllable device 200 for controlling said at least one function accordingly. In some embodiments the detachable knob 100 may comprise an orientations sensor 900 configured to determine an orientation of the knob 100. By determining the orientation of the knob 100 it is possible to determine which function(s) of the controllable device 200 that may be controlled. The detachable knob 100 may comprise further elements, but for the sake of clarity they are not illustrated here.

The memory 600 may comprise settings, which may be preset or may be set by the user, regarding the functions that the detachable knob 100 may control of the controllable device 200. These settings may be saved within the memory 600 of the detachable knob 100, within one or more memories 2600 of the controllable device 200 and/or within a remotely accessible cloud based storage. Accordingly, the instructions used by the detachable knob 100 and the controllable device 200 may be locally stored and/or stored in a cloud based storage. One of the advantages with locally stored instructions may be that the detachable knob 100 may function even in an offline mode when no connection is available. One of the advantages with the instructions stored in a cloud-based storage may be that the instructions are replicated and the cloud storage may be used as a backup if the detachable knob 100 is lost or broken.

By saving the settings within the detachable knob 100 or in a cloud-based storage, it may in one example embodiment be possible for the user to use the detachable knob 100 with any controllable device 200. For example, it may be possible for the user to bring the detachable knob 100 from the user's home to the user's office or to a party and control a controllable device 200 located at that place while using the user's own settings.

In one embodiment, the settings regarding the functions that the detachable knob 100 may control of the controllable device 200 may be stored within one or more memories 2600 of the controllable device 200. These settings may be transferred via a communication interface 2300 of the controllable device 200 to the communication interface 300 of the detachable knob 100. The detachable knob 100 may accordingly receive its settings from the controllable device 200 and the controllable device 200 program the detachable knob 100. In one embodiment, this transfer of settings may be done when the detachable knob 100 is detachably attached to the controllable device 200. By transferring the settings regarding the functions that the detachable knob 100 may control of the controllable device 200, the controllable device 200 may be independent of which detachable knob 100 that control the controllable device 200. Accordingly, the controllable device 200 may be controlled by any detachable knob 100.

In one embodiment, the settings may be transferred from the controllable device 200 to the detachable knob 100 when the detachable knob 100 is detachably attached to the controllable device 200 and after that, the user may activate the transferring by pressing, or tapping, the detachable knob 100. The tap or press may be registered by the orientation sensor 900 within the detachable knob 100.

Figure 4B:
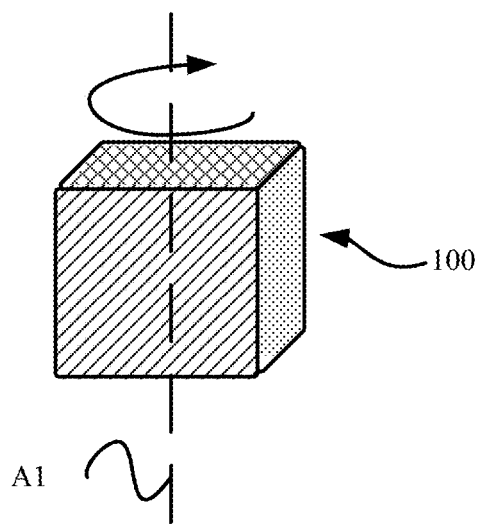
FIG. 4B shows an example of a detachable knob with its rotational axis.

The detachable knob 100 may be of any shape and size. It may be shaped as a polyhedron having a plurality of sides, see for example FIG. 8. Alternatively, the detachable knob 100 may be of a substantially cylindrical shape, see for example FIG. 7B. In one embodiment the detachable knob 100 may be shaped substantially as a cube which has six square sides, as illustrated in FIGS. 4A and 4B. The size and shape of the detachable knob 100 may be chosen with respect to both function and design of the detachable knob 100, but also with regard to the controllable device 200. This adds to the flexibility of the detachable knob 100 and makes it possible to construct the detachable knob 100 for any desired target group. Different target groups may have different needs. For some people a detachable knob 100 that is relatively big and has a cubical form is the most suitable, while others prefer for example a smaller cylindrical shaped detachable knob 100.

Figure 9:
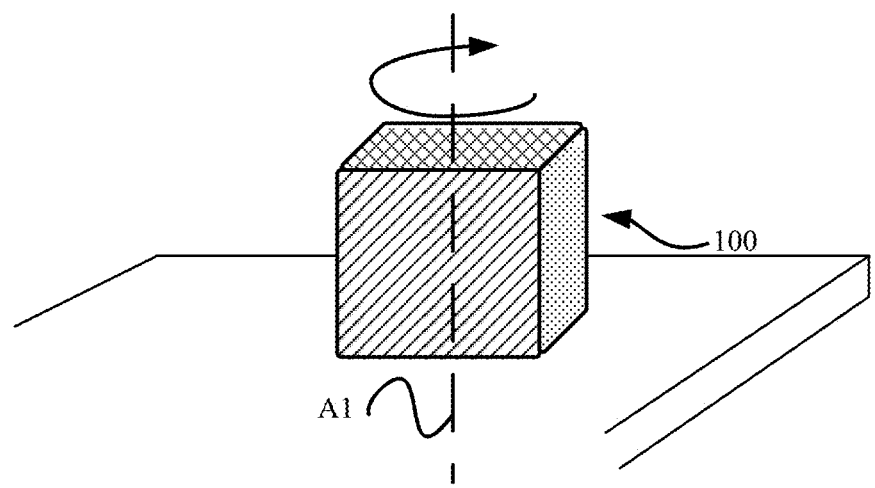
FIG. 9 illustrates a detachable knob, detached from the controllable device, resting at a surface remote from the controllable device.

Depending on the shape of the detachable knob 100, different functionality may be given to the detachable knob 100. In the embodiments when the detachable knob 100 has a plurality of sides, the sides of the detachable knob 100 may be associated with predetermined functions of the controllable device 200. In one embodiment, all of the sides may be associated with predetermined functions. Alternatively, some of the sides may be associated with predetermined functions. Alternatively, only one side may be associated with a predetermined function. When a side is associated with a predetermined function, the detachable knob 100 may be configured to generate a signal for controlling the at least one function of the controllable device 200 based on orientation and/or rotation of the detachable knob 100. For example, if the detachable knob 100 is laying on a table with the square patterned surface up, as illustrated in FIG. 9, the volume function may be controlled by rotating the detachable knob 100 around its rotational axis A1. If the detachable knob 100 instead lays on the table with the striped side up, the power function may be controlled. An advantage of assigning different functions to the different sides is that it may be easy to change which function that may be controlled by switching which side of the detachable knob 100 that is faced up. Another advantage may be that many different functions may be controlled by the detachable knob 100 without the need to change any settings at the controllable device 200.

The detachable knob 100 may be uniformly designed, with the same appearance of all the sides of the knob 100. Alternatively, the detachable knob 100 may be designed with different figures, patterns or text on the sides, as illustrated in FIGS. 4A and 4B. Alternatively, or additionally, the detachable knob 100 may be constructed with an outward or inward pattern, which allows for the inclusion of braille on the knob. In the embodiments when the detachable knob 100 have different designs, i.e. patterns, figures or text, on the sides of the detachable knob 100, the user may be assisted when controlling the controllable device 200. By including intuitive figures on the sides of the detachable knob 100, a chosen function may be mirrored. For example, if one of the sides of the detachable knob 100 is designed with a note, this side may be used for controlling the volume. A side with a battery may, for example, be used to signal that the side is used for the power function etcetera.

In a further embodiment, the detachable knob 100 may comprise a physical reference point on at least one of the sides of the detachable knob 100. The physical reference point may guide the user to determine, when rotating the detachable knob around the rotational axis A1, how much the detachable knob 100 has to be rotated in order to achieve a certain result. This physical reference point may be one or more LEDs and/or may be a physical mark in the design of the detachable knob 100. The physical reference point may be designed in any preferable way as long as it may indicate the rotational movement of the detachable knob 100 to the user.

Regardless of the shape of the detachable knob 100, the controlled function(s) may be controlled by rotating the detachable knob 100 about the rotational axis A1. The rotational axis A1 is oriented perpendicularly to the surface on which the detachable knob 100 rests, see FIG. 9. The rotational axis A1 is perpendicular to the resting surface regardless if the detachable knob 100 is attached to the controllable device 200 or if it is attached to any other surface remote from the controllable device 200. Furthermore, the rotational axis A1 is also perpendicular to the resting surface regardless if the surface is horizontal, such as for example a table, or if the surface is vertical, such as for example a refrigerator. By not limiting the detachable knob 100 to only be functional on the controllable device 200 or horizontal surfaces, it is made possible to achieve an increased flexibility. It is, for example, possible to use the detachable knob 100 also in environments with few, or none, suitable horizontal areas, such as working areas with crowded desks, kitchen areas, garage and gyms.

Figure 8:
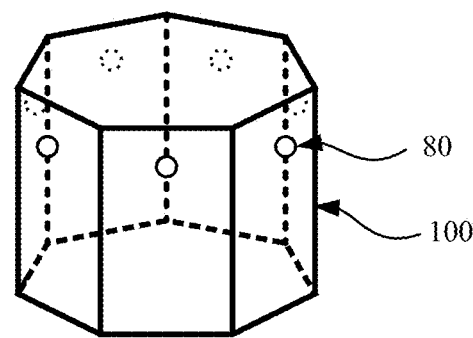
FIG. 8 shows still another example of a detachable knob.

The detachable knob 100 may in some embodiments be provided with a feedback apparatus 80. The feedback apparatus 80 may provide the user with a visual, tactile and/or audio feedback of the controlling of the function that controls the controllable device 200 and may provide the user with feedback of how much the detachable knob 100 has been rotated. The feedback apparatus 80 in one embodiment may comprise at least one LED. As illustrated in FIG. 8, the feedback apparatus 80 may be one LED at each side of the detachable knob 100, but the feedback apparatus 80 may comprise any number of LEDs arranged separately or in arrays at any side(s) of the detachable knob 100. While the detachable knob 100 is rotated around its rotational axis A1, the LEDs may be turned on one by one, at a rate corresponding to the rotational movement. Alternatively, the LEDs may have different colors and in dependence with the rotational movement, the color of the LEDs may change. Alternatively, the intensity of the LEDs may change in dependence with the rotational movement. By proving the user with feedback of the rotation, it may be easier for the user to relate the controlled function to the rotational movement of the detachable knob 100. It may also give the user a reference point, in order to know how much the detachable knob 100 has to be rotated in order to achieve a wanted effect of the function controlling the controllable device 200. In another embodiment, the feedback apparatus 80 may comprise of a sound generating device. The sound generating device may provide the user with feedback of the rotational movement of the detachable knob 100 by outputting a sound that may increase in volume and/or pitch and/or intensity as the rotational movement continues. The feedback apparatus 80 may provide feedback to any input between a maximum and minimum value of the controllable function.

By proving the user of the detachable knob 100 with a feedback of the rotational movement, the problems that arise in connection with latency due to response times may be solved. One example of such a problem is that a user may think that the input to the detachable knob 100 has not been registered and the user may accordingly continue to rotate the detachable knob 100 around its rotational axis A1 in order for the controllable device 200 to react to the input. For example, if the user rotates the detachable device 100 in order to increase the volume of the controllable device 200 and the user experiences that nothing happens, the user probably will continue the rotational movement of the detachable knob 100. When the controllable device 200 finally respond to the rotation, the volume probably will be unnecessary high. However, with the feedback apparatus 80, the user may see or hear an instant feedback of the rotation of the detachable knob 100 and may experience that the detachable knob 100 reacts to the input. Accordingly, the user may be prepared to wait for a few hundredth of a second in order for the controllable device 200 to respond to the input. In a further embodiment, the detachable knob 100 may be a voice command device. A voice command device is a device controlled by means of the human voice. By controlling the detachable knob 100 by voice, the need for buttons, dials and switches is reduced. The user may easily operate the controllable device 200 with his/her hands full or while doing other tasks. Accordingly, the user commands the detachable knob 100 with his/her voice and the command may then be used by the detachable knob 100 to control the at least one function of the controllable device 200. In order for the detachable knob 100 to function as a voice command device, the detachable knob 100 may convert the analog waves produced by the user into a digital format. The voice command may be received by the detachable knob 100 through an audio interface 120. By speech recognition, the spoken word may be matched into a computer command and the computer command, processed by the processor 400, may be transmitted by the communications interface 300 to the controllable device 200.

In one embodiment, the detachable knob 100 controlled by voice may get its context by a voice command. The context may set the function that is subsequently controlled by the detachable knob 100. As an example, when a user utters the command "volume", the context for the detachable knob 100 may be set to adjust the volume of the controllable device 200. Subsequently to setting the context to volume, the volume may be increased or decreased by rotating the detachable knob 100 around its rotational axis A1, as described above. In another example, the user may command the detachable knob 100 to control the lighting within a room by saying the word "light". Subsequently to the command, the illumination may be increased or decreased by rotating the detachable knob 100 around its rotational axis A1. The command may further be specified by saying "living room lighting", which may accordingly only control the illumination in the living room. Further examples of commands may be, without limitation, "radio station", "temperature", "curtain", "source", etc. By setting the context for the detachable knob 100 by an intuitive voice command, the functions controlled by the detachable knob 100 may be easily and intuitively set, which may increase the user experience and reduce the need for manuals. The voice commands may be set by the user or may be preset and may be saved within the memory 600 of the detachable knob 100. The voice command settings may additionally, or alternatively, be saved within the memory 2600 of the controllable device and/or within a cloud based storage.

In a further embodiment, a voice command may further be used to control the functions controlled by the detachable knob 100. First, the context for the detachable knob 100 may be set. The context may be set by turning the detachable knob 100 such that the side associated with the wanted function is faced in the right direction, as described above, or alternatively, the context may be set by a voice command, as previously described. When the context is set, a voice command may subsequently be used to control the chosen function. In one embodiment, the voice command may be "raise". The command "raise" may be used for increasing the volume, for increasing the illumination and/or for increasing the temperature within a room. Accordingly, the same voice command may be used within different contexts. The voice commands may be locally stored at the memory 600 within the detachable knob 100 and/or within the memory 2600 of the controllable device and/or within a cloud based storage.

Figure 10:
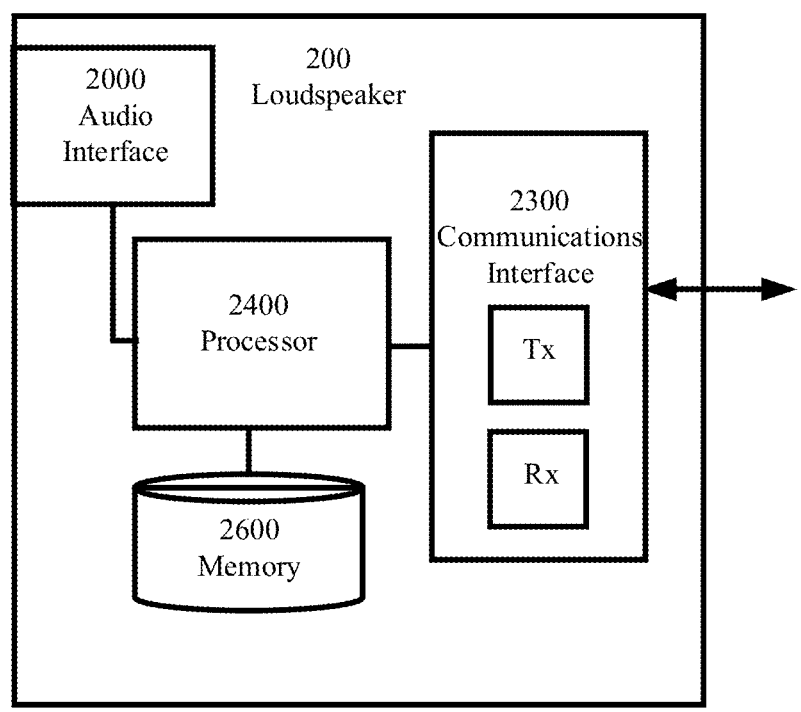
FIG. 10 shows an example implementation of a controllable device.

In a second of its aspects, this disclosure also presents a controllable device 200. Reference is now made to FIG. 10, which schematically illustrates one example embodiment of the controllable device 200 shown in FIGS. 2 and 3. The controllable device 200 may be configured to be communicatively coupled to the detachable knob 100 such that the knob 100 may be configured to control at least one function of the controllable device 200. The knob 100 may be a detachable knob and may be configured for detachable attachment to the controllable device 200. The controllable device 200 may be of any shape or size as long as it houses a surface where the detachable knob 100 may be detachably attached. The controllable device 200 in the figures is illustrated as cubical, but it may for example be cylindrical, spherical or shaped as any polyhedron.

The controllable device 200 may comprise one or more processors 2400 and one or more memories 2600. The controllable device may also comprise an audio interface 2000. The audio interface 2000 may be configured to output audio of the controllable device 200. The audio interface 2000 may be operatively connected to the one or more processors 2400. The one or more processors 2400 are operatively connected to the one or more memories 2600. The one or more memories 2600 comprise instructions which are executable by the one or more processors 2400.

In a further embodiment, the controllable device 200 may be a voice command device. By controlling the controllable device 200 by voice, the further need for buttons, dials and switches is reduced. The voice commands may be received by the controllable device 200 through the audio interface 2000. By speech recognition, the spoken word may be matched into a computer command and the computer command, processed by the processor 2400, may, for example, program the settings regarding the functions that may be controlled by the controllable device 200. Accordingly, the controllable device 200 may program the detachable knob 100 through the settings that the controllable device 200 received through the voice commands.

Figure 11A:
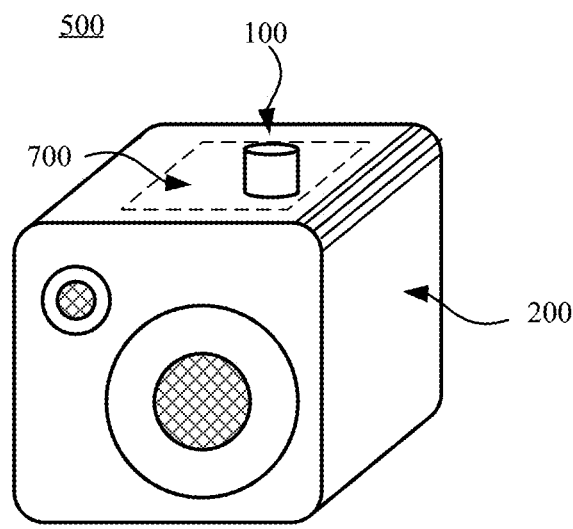
FIG. 11A illustrates an example of a controllable device with a user interface.

In one embodiment, the controllable device 200 may comprise a user interface 700, as illustrated in FIG. 11A. The detachable knob 100 may in some embodiments be detachably attachable to the user interface 700, see FIGS. 11A, B and C. The user interface 700 may be a surface for providing visual feedback to the user. This feature makes it easy, efficient and user-friendly to operate the controllable device 200. Generally, the user needs to provide minimal input to achieve a desired output of the controllable device 200.

Further, the undesired output to the user is minimized. The user interface 700 may for example display a chosen function to be controlled by the detachable knob 100. Additionally, or alternatively, the user interface 700 may for example display a selection made with the detachable knob 100.

The user interface 700 may in some embodiments comprise a touch-sensitive user interface. A touch-sensitive user interface does not only provide information, it may also receive information. Example of such received information may be information from the user of how to configure the detachable knob 100 and which functionality that may be controlled by the detachable knob 100. In some embodiments, the detachable knob 100 may be used to provide the touch interaction with the touch-sensitive user interface 700 in order to input information into the user interface 700. Additionally, or alternatively, a finger or any finger-like equipment may be used in order to input information into the user interface 700. In one embodiment, the user interface 700 may comprise a grid of Light Emitting Diodes, LEDs, in order to display information. In one embodiment, the user interface 700 may comprise an e-ink display. In one embodiment, the user interface 700 may comprise an Organic Light Emitting Diode, OLED, display. The user interface 700 may also comprise a combination of any of the mentioned alternatives. The user interface 700 may be configured to control which at least one function that is controllable by means of the detachable knob 100.

Figure 11B:
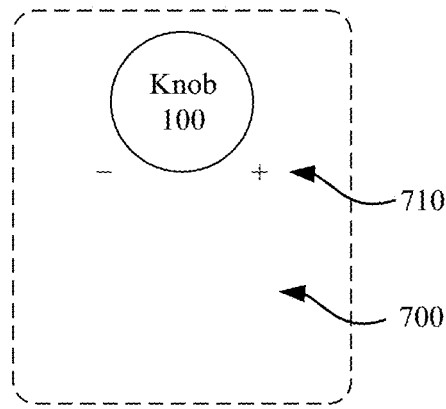
FIG. 11B shows an example of a user interface.
Figure 11C:
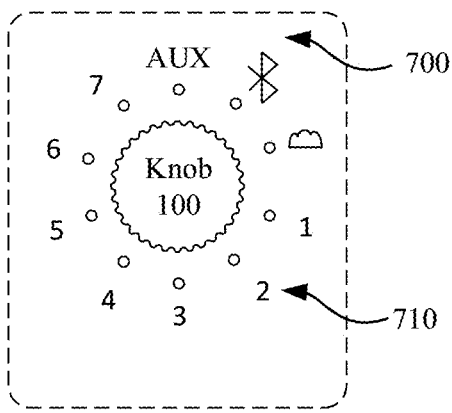
FIG. 11C shows another example of a user interface.

The user interface 700 may comprise visual indications 710, see FIGS. 11B and C. The visual indications 710 may comprise textual information, such as for example "−" and/or "+" to indicate the rotational directions of decreasing/increasing the volume. The user interface 700 may optionally include textual information 710 to indicate the brand, or trademark, of the controllable device 200. In one embodiment, the visual indication 710 may be configured to give visual indications of detected events occurring in the controllable device 200 as a prompt for potential human interaction with the user interface 700. The visual indication 710 may also comprise textual information to indicate the earlier-mentioned selection possibilities. The textual information (i.e., the selection possibilities) may be accompanied with a respective visual indicator, for example by Light Emitting Diodes (LEDs). The behavior of the LEDs may be varied in many ways in order to give the user appropriate visual indications of detected selections, e.g. as a prompt for potential human interaction with the user interface 700. For example, in one embodiment, when a user selects a new source by turning the knob, the selected source may be indicated by a dimmed light of the accompanying LED. The LED indicating the currently playing source may still have a steady light. For instance, not until the new source has been activated the LED light will then be steady and the previous source LED light will be turned off. As will be appreciated, the LED behavior may be varied in many ways depending on user demands and other possible system requirements. In one embodiment, preferably when the user interface 700 is a touch-sensitive user interface 700, the user interface 700 may be divided into different zones. Each zone may be associated with a particular context. For example, when the detachable knob 100 is placed in one zone, the detachable knob 100 may be configured to control the light by its rotational movement around its rotational axis A1. When the detachable knob 100 is placed in another zone, the detachable knob 100 may be configured to control the temperature etc. Accordingly, the different zones of the user interface 700 may be associated with different functions such as volume, radio station, temperature, light, length of curtains etc.

In one embodiment, when the controllable device 200 is configured to be a voice controlled device, the user interface 700 of the controllable device 200 may be configured to display processed results of the voice commands. When the user for example utters a command such as "favorite radio station", the user interface 700 may display all possible options that may be considered as the user's favorite radio stations. This may facilitate for the user to choose a wanted radio station by making a selection at the user interface 700. The selection may be made either by rotating the detachable knob 100 to the wanted radio station, by a touch interaction with the displayed options or by a voice command where the user utters one of the displayed radio stations.

In some embodiments, the detachable knob 100 is detachably attached to the controllable device 200 by means of magnetic attraction and the controllable device 200 comprises a magnetic element 1100, as described above. In these embodiments, when the controllable device 200 also comprises a user interface 700, the magnetic element 1100 may be positioned in proximity to said user interface 700. Accordingly, the detachable knob 100 may be placed on, or close to, the user interface 700. This will facilitate using the knob 100 together with the user interface 700 and by using the two units together. Thus, it will be possible to expand the options of the functions to be controlled by the detachable knob 100.

In one embodiment, the controllable device 200 may comprise a hole that may match a center part 10 of the detachable knob. When the center part 10 of the detachable knob 100 may be placed within the matching hole of the controllable device 200, the detachable knob 100 may be detachably attached to the controllable device 200.

The controllable device 200, in some embodiments, may comprise a communications interface 2300, or a communications circuitry, as illustrated in FIG. 10, in order for the controllable device 200 to communicate with other devices, e.g. via a network (such as the Internet). The communication interface 2300 is configured for wireless communication with the detachable knob 100. To this end, the communications interface 2300 may comprise a transmitter (Tx) and a receiver (Rx). Alternatively, the communications interface 2300 may comprise a transceiver (Tx/Rx) combining both transmission and reception capabilities. The communications interface 2300 may include a radio frequency (RF) interface allowing the controllable device 200 to communicate with the detachable knob 100 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, short-range communication such as Bluetooth, etcetera. The communication interface 2300 may also enable the controllable device 200 to communicate with a cloud based storage.

Regardless of which wireless communication that is used, the same technology is used by both the controllable device 200 and the detachable knob 100 when they communicate with each other.

As has been described above, in a third of its aspects, this disclosure also presents a combination 500 of a detachable knob 100 and a controllable device 200. Such combination 500 is illustrated in for example FIGS. 2, 3 and 11A. The detachable knob 100 may be communicatively coupled to the controllable device 200 to control at least one function of the controllable device 200. The combination 500 of the detachable knob 100 and the controllable device 200 may be configured to function regardless of whether the detachable knob 100 is detachably attached to or detached from the controllable device 200.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while different controllable functions have been described herein one of ordinary skill in the art will recognize that other functions may also be possible. Hence, it will be appreciated that the functions described herein may be varied in dependence of e.g. user demands and/or system requirements. Furthermore, although specific terms may be employed herein, they are used in a generic and descriptive sense only and not for purposes of limitation. Therefore, a person skilled in the art would recognize numerous variations to the described embodiments that would still fall within the scope of the disclosure. As used herein, the terms "comprise/comprises" or "include/includes" do not exclude the presence of other elements or steps. Furthermore, although individual features may be included in different numbered example embodiments, these may possibly advantageously be combined, and the inclusion of different numbered example embodiments does not imply that a combination of features is not feasible and/or advantageous. In addition, singular references do not exclude a plurality.

The invention claimed is:

1. A knob for controlling at least one function of a controllable device, wherein the knob is a detachable knob configured for detachable attachment to the controllable device by magnetic attraction and the detachable knob is configured to be communicatively coupled to the controllable device to control the at least one function of the controllable device, and wherein the detachable knob comprises a communications interface configured for wireless communication with the controllable device.

2. The detachable knob according to claim 1, wherein the detachable knob comprises a rechargeable element which is configured to be inductively recharged when the detachable knob is detachably attached to the controllable device.

3. The detachable knob according to claim 1, wherein the detachable knob is configured to control said at least one function of the controllable device when the detachable knob is detachably attached to the controllable device.

4. The detachable knob according to claim 1, wherein the detachable knob is configured to remotely control said at least one function of the controllable device when the detachable knob is detached from the controllable device.

5. The detachable knob according to claim 1, wherein the detachable knob is a rotatable knob having a rotational axis extending in an axial direction, and wherein the detachable knob is rotatable around said rotational axis to control said at least one function.

6. The detachable knob according to claim 5, wherein the detachable knob comprises:
a processor;
a memory comprising instructions which are executable by said processor; and
a communications interface configured for wireless communication with the controllable device, wherein a rotation of the detachable knob around said rotational axis causes a signal to be transmitted to the processor for controlling said at least one function, and in response thereto the processor causes a signal to be transmitted, by means of the communications interface, to the controllable device for controlling said at least one function accordingly.

7. The detachable knob according to claim 5, wherein the detachable knob has a substantially cylindrical shape.

8. The detachable knob according to claim 1, wherein the detachable knob is shaped as a polyhedron having a plurality of sides, each side being associated with a predetermined function of the controllable device, such that, in operation, the detachable knob is configured to generate a signal for controlling said at least one function of the controllable device based on orientation and/or rotation of the detachable knob.

9. The detachable knob according to claim 8, wherein the detachable knob comprises:
a processor;
a memory comprising instructions which are executable by said processor; and
a communications interface configured for wireless communication with the controllable device, wherein an orientation and/or rotation of the detachable knob causes a signal to be transmitted to the processor for controlling said at least one function, and in response thereto the processor causes a signal to be transmitted, by means of the communications interface, to the controllable device for controlling said at least one function accordingly.

10. The detachable knob according to claim 1, wherein the detachable knob comprises an orientations sensor configured to determine an orientation of the detachable knob.

11. The detachable knob according to claim 1, wherein the detachable knob is configured to be controlled by a voice command.

12. A controllable device wherein the controllable device is configured to be communicatively coupled to a knob such that the knob is configured to control at least one function of the controllable device, wherein the knob is a detachable knob configured for detachable attachment to the controllable device by magnetic attraction, and wherein the controllable device comprises a communications interface configured for wireless communication with the detachable knob.

13. The controllable device according to claim 12, wherein the controllable device comprises a user interface and the detachable knob is detachably attachable to said user interface and wherein the user interface is configured to control which at least one function that is controllable by means of the detachable knob.

14. The controllable device according to claim 13, wherein the user interface comprises a touch-sensitive user interface.

15. The controllable device according to claim 12, wherein the controllable device is configured to inductively recharge the detachable knob when the detachable knob is detachably attached to the controllable device.

16. The controllable device according to claim 12, wherein the controllable device is configured to be controlled by a voice command.

17. The controllable device according to claim 12, wherein the controllable device is a loudspeaker.

18. The controllable device according to claim 12, wherein the detachable knob is configured to be communicatively coupled to the controllable device to control the at least one function of the controllable device, and wherein the detachable knob comprises a communications interface configured for wireless communication with the controllable device.

* * * * *